United States Patent Office 3,165,453
Patented Jan. 12, 1965

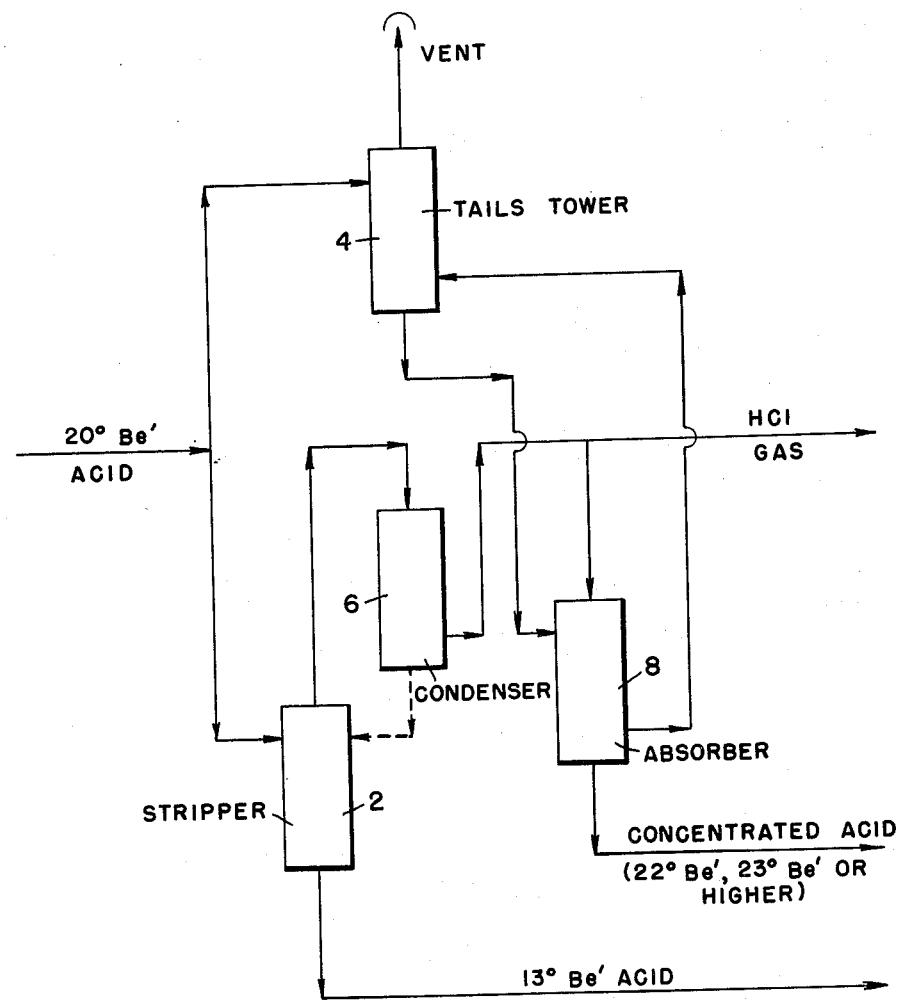

3,165,453
METHOD OF CONCENTRATING AQUEOUS HCl BY VAPORIZATION, COMBINED WITH PARTIAL CONDENSATION AND ABSORPTION
Robert C. Sutter, Painesville, Ohio, assignor to Diamond Alkali Company, Cleveland, Ohio, a corporation of Delaware
Filed July 20, 1959, Ser. No. 828,151
2 Claims. (Cl. 202—67)

This invention relates to a process for preparing concentrated hydrochloric acid and more particularly relates to a process for preparing a concentrated hydrochloric acid by the concentration of a weaker hydrochloric acid.

In many industrial processes, particularly those directed to the chlorination of hydrocarbons, large quantities of HCl gas are formed as a by-product. Exemplary of such processes are those directed to the chlorination of the lower aliphatic hydrocarbons to form the various chlorinated derivatives thereof, e.g., methyl, chloride, methylene chloride, chloroform, carbon tetrachloride, ethylene dichloride, and dichloroethylene, trichloroethylene, tetrachloroethylene, and the like. Additionally, the chlorination of the various paraffinic hydrocarbon waxes, to produce chlorinated paraffin waxes, likewise produces large quantities of gaseous HCl as a by-product.

Customarily, the by-product gas streams from all of these processes are treated with water to remove the HCl as a rather weak acid solution, e.g., at 20° Bé. acid or less. Frequently, these weak acid solutions are also heated and stripped of any contained organics so that the concentration thereof is further decreased. Because of the high partial pressure of HCl gas over strong acid solutions, thus making separation of a strong acid difficult, in these HCl recovery processes, it is generally considered to be more economical to recover the HCl as a weak acid solution. However, these weak acid solutions, e.g., 20° Bé or less, are not as valuable commercially as are the more concentrated acids, such as 22° or 23° Bé. acids, and additionally such acids are less economical to transport than the more concentrated acids. It would, therefore, be very desirable to be able to concentrate these weaker hydrochloric acids easily and economically so that the advantages in the use and transportation of such concentrated acids could be obtained.

It has been proposed to produce a more concentrated hydrochloric acid from a weaker acid by distilling the weaker acid and fractionally condensing the aqueous vapor mixed with hydrochloric acid gas from the distillation at various predetermined temperatures. Although, by such a process, it is possible to produce acids of varying high concentrations, it will be appreciated that the temperature controls required for such an operation would, of necessity, be very critical. In addition to this difficulty in operation, the expense of such a process is sufficiently high as to make it unattractive.

Other processes which have been proposed for concentrating weak hydrochloric acid have been capable of producing only one or two specific higher concentrations of acid, as for example, anhydrous hydrochloric acid. Although these processes are satisfactory for use where there is a demand for the specific concentration which can be produced, because of their lack of flexibility, they are not satisfactory for widespread application. Additionally, such processes generally involve multiple distallations and fractional condensations so that the resulting complexity of operation and necessarily expensive apparatus render them generally unacceptable.

It is, therefore, an object of the present invention to provide a process for the concentration of weak hydrochloric acid solutions.

Another object of this invention is to provide a method for concentrating weak hydrochloric acid solutions, which method is not only economical to practice, but is also free of the operational complexities which have plagued prior art processes.

A further object of this invention is to provide a process for concentrating weak hydrochloric acid solutions, which process will have sufficient flexibility that virtually an infinite number of different concentrations of acid can be produced.

These and other objects will become apparent to those skilled in the art from the description of the invention which follows.

The drawing which is attached hereto and which forms a part hereof is a diagrammatic flowsheet illustrative of one embodiment of the method of the present invention.

The method of the present invention envisions separating the azeotropic hydrochloric acid from HCl gas in a weak hydrochloric acid having a concentation in excess of the azeotrope hydrochloric acid, cooling the thus separated HCl gas, absorbing the thus cooled HCl gas in a weak hydrochloric acid so as to concentrate said weak acid and recovering the thus concentrated hydrochloric acid as the final product of the process.

More specifically, in the practice of the present invention, a stream of weak hydrochloric acid, having a concentration in excess of the azeotrope 13° Bé. acid, is heated to separate the azeotrope, 13° Bé. acid, from HCl gas. The thus separated HCl gas, which is admixed with water vapor, is then cooled and passed in contact with a weak hydrochloric acid solution and is absorbed thereby, thus concentrating the weak hydrochloric acid solution. The thus concentrated hydrochloric acid is then removed and recovered as the final product of the process. It should be noted that the HCl gas with which the weak hydrochloric acid is concentrated contains no more than about 5% water vapor and is thus suitable for gas phase hydrochlorinations. Therefore, if it is desired, a portion of this HCl gas may be removed from the process, for this or any other purpose, prior to bringing it into contact with the weak hydrochloric acid which is to be concentrated.

It is to be appreciated that while reference has been made hereinabove to the concentrations of a weak hydrochloric acid, the term "weak" is to be taken merely as relative since the HCl content of this acid which is to be further concentrated can be anywhere from 0% up. In this respect, it is seen that the present process is quite flexible in that the hydrochloric acid into which the HCl gas is absorbed may be from any source and of any concentration, even to the extent of being merely water having no appreciable hydrogen chloride content.

Similarly, the feed stream acid, from which the HCl gas is removed, may be from any source or of any concentration, so long as the acid concentration is greater than that of 13° Bé. acid which is the azeotrope. It is believed to be quite obvious that a feed acid having a concentration of 13° Bé. or less could not be used in the present process inasmuch as it would not then be possible to separate the 13° Bé. acid azeotrope and HCl gas from such feed stream. This, however, is the only limitation on the concentration of this acid.

It is believed to be readily apparent that in the operation of the present process, the volume and concentration of the hydrochloric acid produced will depend upon both the volume of the feed stream acid and the volume and concentration of the acid stream into which the HCl gas is absorbed. Thus, where it is desired to produce X gallons of a hydrochloric acid having a concentration of Y%, it is obvious that X gallons of absorbing acid, regardless of its concentration, will be required to produce X gallons of concentrated acid. Thereafter, it is only necessary to determine how much HCl gas is required to increase the concentration of this volume of absorbing acid to the desired concentration and then supply a sufficient volume of feed acid which will produce this volume of HCl gas. Once these determinations have been made, and a ratio of feed acid to absorbing acid established, the quantity of concentrated acid produced can be varied merely by varying the quantity of both the feed acid and absorbing acid, while maintaining this ratio constant. Obviously, if there are variations in the concentration of the feed acid and the absorbing acid, these variations will necessitate an adjustment of the ratio of the volumes of feed acid to absorbing acid in order to obtain the desired concentration and quantity of concentrated acid product.

Similarly, if it is desired to maintain the volume of concentrated acid produced at a constant amount but vary the concentration of this acid, the ratio of the feed acid to the absorbing acid will be varied by varying the amount of feed acid which is supplied. Once a new ratio of feed acid to absorbing acid has been established, the volume of concentrated acid produced can be varied by varying both the amount of feed acid or absorbing acid while maintaining the new ratio of these acids constant. It is, thus, obvious that the operation of the present process is independent of the concentrations of the feed acid and the absorbing acid, with the one exception that the feed acid has a concentration of greater than the 13° Bé. azeotrope, and further that by this process virtually infinite variations in the concentration of the acid product are possible.

In a preferred embodiment of the present invention, a feed stream of 20° Bé. hydrochloric acid is heated to separate HCl gas and the azeotrope 13° Bé. acid. The HCl gas which is separated is then cooled and absorbed into a weak hydrochloric acid solution to produce a more concentrated hydrochloric acid. Preferably, the absorbing acid is from the same source as the feed acid and thus in this instance would have a concentration of 20° Bé. However, if desired, the 13° Bé. acid azeotrope which has been separated from the HCl gas in the feed stream, may be used as the absorbing acid. If this 13° Bé. acid is not so utilized, it may be used in a liquid phase hydrochlorination in which it is desired to take advantage of a constant boiling mixture so as to maintain as high a temperature as possible thus the use of super atmospheric pressures. Additionally, where the original feed acid comes from an absorber in which HCl gas produced from a chlorination reaction is contacted with water or weak acid, the 13° Bé. acid may be returned to this absorber for further concentration so that it is then usable as a portion of the feed stream acid.

While reference has been made heretofore to cooling the HCl gas which is separated from the feed acid, it will be appreciated that the extent of the cooling of this gas depends only on the amount of heat which can be absorbed by the absorbing acid without causing its vaporization. Thus, where it is desired to produce a relatively large volume of acid of a concentration not greatly in excess of the absorbing acid, little or no cooling of the HCl gas will be required. However, on the other hand, if the quantity of absorbing acid is relatively small and a relatively large amount of HCl gas is to be obsorbed therein, it is obvious that substantially more cooling of this gas will be required to enable it to be absorbed into the absorbing acid without causing the vaporization thereof. In this regard, it is to be noted that where it is desired to produce only HCl gas to be utilized for example in a gas phase hydrochlorination, so that there is no absorbing acid used, the HCl gas must be cooled sufficiently to condense substantially all of the water vapor therefrom, which water vapor, as a strong hydrochloric acid, will be recycled to the heating portion of the process to be separated into the 13° Bé. acid azeotrope and HCl gas.

Referring now to the drawing which illustrates one embodiment of the present process, a feed stream of 20° Bé. hydrochloric acid is split into two portions, one portion going to a tails tower 4, and the other portion going to a stripper 2. Within the stripper 2, the 20° Bé. acid is heated and the azeotrope 13° Bé. acid is separated from HCl gas. The HCl gas which is admixed with water vapor, passes from the stripper 2 to a condenser 6 wherein it is cooled to a sufficient extent so that it may be obsorbed in the absorbing acid without causing vaporization thereof. The thus cooled HCl gas from the condenser 6 is passed through an absorber 8 wherein it is contacted with the portion of the feed stream which passes through the tails tower 4. If desired, a portion of the HCl gas may be removed from the line between the condenser 6 and the absorber 8 for utilization in some other process. Where it is desired to withdraw all of the HCl gas from this line, and not pass any to the absorber 8, the HCl gas will be cooled in the condenser to a point at which strong HCl acid will condense therefrom, which strong acid is returned to the stripper as shown by the dotted line. The portion of the feed stream which has been directed to the tails tower 4, passes through this tower to the absorber 8 wherein it is contacted by the HCl gas from the condenser 6. Within the absorber, the acid from the tails tower 4 is concentrated by the HCl gas, forming an acid of 22° Bé., 23° Bé. or higher concentration as desired, which acid is removed from the absorber as the product of the process. Any HCl gas which is not absorbed in the absorber 8 is returned to the tails tower 4, where it is absorbed by the acid passing therethrough. Any gasses not thus absorbed are passed out of the system by means of the vent on the tails tower.

It will be appreciated, that in the process described hereinabove, the feed stream of weak acid and the feed stream of absorber acid may be from any convenient source, such as solutions of process gases containing HCl from furnace reactions or chlorination reactions, the only requirement being that the stream of feed acid have a concentration greater than the azeotrope 13° Bé. acid.

In order that those skilled in the art may better understand the method of the present invention and the manner in which it may be practiced, the following specific examples are given.

*Example 1*

Using the apparatus and procedure described above, with a feed stream of 159.9 pounds per minute of 20° Bé. hydrochloric acid, 111.2 pounds per minute of the feed stream are directed to a tails tower and 48.7 pounds per minute of the feed stream are directed to a steam stripper. The temperature within the tails tower is maintained within the range of 70–100° F. while the temperature of the stripper is maintained within the range of 200–230° F. Within the stripper, the azeotrope 13° Bé. acid is recovered at the rate of 40.9 pounds per minute, the temperature of this acid being within the range of 80–100° F. The HCl gas from the stripper is passed to a condenser wherein it is cooled to a temperature of about 60° F. and the HCl gas at a concentration of 95% is recovered at the rate of 7.8 pounds per minute. The HCl gas from the condenser is directed to an absorber wherein it contacts and is absorbed by the portion of the acid stream from the tails tower. 119 pounds per minute of 22° Bé. acid are recovered from the absorber, which acid has a temperature within the range of 60–80° F.

*Example 2*

Using the apparatus and the procedure of Example 1 with a feed stream of 203.4 pounds per minute of 20° Bé. acid, the feed stream is split into two portions, 74.1 pounds per minute being directed to a tails tower and 129.3 pounds per minute being directed to a steam stripper. The tails tower is maintained at a temperature within the range of 70–100° F., while the steam stripper is maintained at a temperature within the range of 200–230° F. Within the steam stripper, the azetrope 13° Bé. acid is separated, which acid is recovered at the rate of 113.8 pounds per minute, at a temperature within the range of 80–100° F. The HCl gas from the steam stripper is passed to a condenser wherein it is cooled to a temperature of about 60° F. and HCl gas of a concentration of 95% is recovered from the condenser at the rate of 19.4 pounds per minute. Of this 19.4 pounds per minute 95% HCl gas, 14.2 pounds per minute are removed from the system for use in other processes. The remaining 5.2 pounds per minute of HCl gas are directed to an absorber wherein they contact and are absorbed by the portion of the acid stream from the tails tower. 79.5 pounds per minute of 23° Bé. acid are recovered from the absorber, which acid has a temperature within the range of 60–80° F.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A method for concentrating aqueous hydrochloric acid of a concentration greater than 13° Bé. which includes the steps of:
   (A) Splitting a body of liquid aqueous hydrochloric acid having a hydrogen chloride content greater than that equivalent to 13° Bé. into two portions.
   (B) Heating the first of said portions to form a first vapor mixture of hydrogen chloride and water, and liquid hydrochloric acid having a hydrogen chloride content substantially equivalent to 13° Bé.;
   (C) Passing said first vapor mixture to a condenser wherein it is cooled to a temperature sufficiently low to separate a liquid aqueous hydrochloric acid phase and a second vapor mixture of hydrogen chloride and water;
   (D) Passing said second vapor mixture to the second portion of aqueous hydrochloric acid from step (A) and absorbing it therein at a temperature below the boiling point of said second portion, and recovering the body of aqueous hydrochloric acid thus concentrated.

2. The method of claim 1 wherein the liquid aqueous hydrochloric acid separated in step (C) is recycled and combined with the first portion of aqueous hydrochloric acid which is heated in step (B).

References Cited in the file of this patent

UNITED STATES PATENTS

| | | |
|---|---|---|
| 1,398,224 | Fredriksson | Nov. 29, 1921 |
| 1,628,829 | Drefahl | May 17, 1927 |
| 1,758,351 | Campbell | May 13, 1930 |
| 1,906,467 | Heath | May 2, 1933 |
| 2,436,432 | Hunter | Feb. 24, 1948 |
| 2,490,454 | Myers | Dec. 16, 1949 |
| 2,545,314 | Seebold | Mar. 13, 1951 |
| 2,909,240 | Colton | Oct. 20, 1959 |

FOREIGN PATENTS

| | | |
|---|---|---|
| 586,845 | Canada | Nov. 10, 1957 |